(12) United States Patent
Ishikawa et al.

(10) Patent No.: US 7,829,202 B2
(45) Date of Patent: Nov. 9, 2010

(54) LARGE-HEAT-INPUT BUTT WELDED JOINTS HAVING EXCELLENT BRITTLE FRACTURE RESISTANCE

(75) Inventors: Tadashi Ishikawa, Futtsu (JP); Takehiro Inoue, Futtsu (JP); Hiroshi Shimanuki, Futtsu (JP); Tadashi Koseki, Futtsu (JP); Jun Otani, Oita (JP); Masanori Minagawa, Oita (JP); Akihiko Kojima, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 553 days.

(21) Appl. No.: 10/576,224

(22) PCT Filed: Oct. 22, 2004

(86) PCT No.: PCT/JP2004/016066

§ 371 (c)(1),
(2), (4) Date: Apr. 13, 2006

(87) PCT Pub. No.: WO2005/037480

PCT Pub. Date: Apr. 28, 2005

(65) Prior Publication Data

US 2007/0131316 A1      Jun. 14, 2007

(30) Foreign Application Priority Data

Oct. 22, 2003   (JP)   ............................. 2003-362122
Oct. 15, 2004   (JP)   ............................. 2004-301823

(51) Int. Cl.
  *B32B 7/02*    (2006.01)
  *B32B 7/04*    (2006.01)
  *B32B 15/18*   (2006.01)
  *B23K 103/04*  (2006.01)

(52) U.S. Cl. ........................ 428/683; 428/217; 403/270; 148/525

(58) Field of Classification Search ........................ None
See application file for complete search history.

(56) References Cited

U.S. PATENT DOCUMENTS

| 5,350,561 | A | 9/1994 | Takamura et al. |
| 6,114,656 | A | 9/2000 | Fairchild |
| 6,322,642 | B1 | 11/2001 | Bocquet et al. |
| 2003/0221752 | A1* | 12/2003 | Utsumi et al. ............... 148/334 |

FOREIGN PATENT DOCUMENTS

JP        59-006355        1/1984

(Continued)

OTHER PUBLICATIONS

JP 2003-105442 English Machine Translation, Yasushi et al, Apr. 2003.*

(Continued)

*Primary Examiner*—Jennifer C McNeil
*Assistant Examiner*—Jason L Savage
(74) *Attorney, Agent, or Firm*—Kenyon & Kenyon LLP (57) ABSTRACT

A large-heat-input butt-welded joint of welded structures prepared by butt-welding high-strength steel plates over 50 mm in thickness, having excellent brittle fracture resistance, is characterized by: (a1) the hardness of the weld metal is not more than 110% of the hardness of the base metal or (a2) the hardness of the weld metal is not less than 70% and not more than 110% of the hardness of the base metal, and, as required, (b) the width of the weld metal is not more than 70% of the plate thickness of the base metal, (c) the width of the region affected by welding whose hardness is softened to not more than 95% of the hardness of the non-heat-affected base metal has a width not less than 5 mm, and/or (d) the prior austenite grain size in the heat-affected zone (HAZ) contacting the welding fusion line is not more than 200 μm.

10 Claims, 4 Drawing Sheets

FOREIGN PATENT DOCUMENTS

| | | | |
|---|---|---|---|
| JP | 3-153828 A | | 7/1991 |
| JP | 06088161 A | | 3/1994 |
| JP | 10-263817 | | 10/1998 |
| JP | 2001-1148 A | | 1/2001 |
| JP | 2001-11448 | | 1/2001 |
| JP | 2001-73071 | | 3/2001 |
| JP | 2001-073071 | * | 3/2001 |
| JP | 3220406 B2 | | 8/2001 |
| JP | 2002-161329 | * | 6/2002 |
| JP | 2002-317241 | * | 10/2002 |
| JP | 2003-049237 | | 2/2003 |
| JP | 2003-105442 | * | 4/2003 |
| JP | 2003-328080 | * | 11/2003 |

OTHER PUBLICATIONS

JP 2001-073071 English Machine Translation, Yoshiyuki et al, Mar. 2001.*

JP 2001-001148 English Machine Translation, Tomomasa et al, Jan. 2001.*

Handbook on the Strength of Weld Joints, Apr. 25, 1988, pp. 4-1 to 4-9.

Report No. 12, No. 4, Japan Welding Society, Fracture Toughness Evaluation of Multipass Weld HAZ with Focus on Mechanical Mis-Matching Effect, 1994, pp. 1-7 (w/ English language abstract).

Report No. 87, The shipbuilding Research Association of Japan, , Evaluation of Brittle Fracture Toughness of Welded Joints of Ship under High Welding Heat Input, Feb. 1978, pp. 93-95, 98, 112, and 129.

Symposium on Welding Metallurgy of TMCP-Steel, May 1985, pp. 140-150.

Chinese Office Action dated Jun. 6, 2008 issued in corresponding Chinese Patent Application No. 2004800308784.

Japanese Office Action dated Aug. 20, 2008 issued in corresponding Japanese Application No. 2004-301823.

European Search Report dated Oct. 1, 2008 issued in corresponding European Application No. EP 04 79 3174.

Kawano et al., "FH355MPa Class Steel Plate for Low-temperature Use LNG Carriers", Feature : Energy, Sep. 2003, vol. 53, No. 2, p. 75-78.

New Structural Steel Plate and Its Property, published in 1981 by Japanese Structural Steel Association (ISSC); with English translation of Fig. 5.3.2 at p. 113.

Structural Steel by Shuzou Ueda, published in 1987 by Corporation of Japanese Steel Association, p. 53; with English translation.

Japanese Industrial Standard JIS Z2201:1998, entitled "Test Pieces for Tensile Test for Metallic Material".

Japanese Industrial Standard JIS Z3101-1972, entitled "Testing Method of Maximum Hardness in Weld Heat-Affected-Zone".

* cited by examiner

LARGE-HEAT-INPUT BUTT WELDED JOINTS HAVING EXCELLENT BRITTLE FRACTURE RESISTANCE

TECHNICAL FIELD

The present invention relates to large-heat-input butt-welded joints having excellent brittle fracture resistance in welded structures and, particularly, those made by butt-welding steel plates having thicknesses greater than 50 mm.

BACKGROUND ART

In welded structures, fractures are mostly likely to occur in welded joints. There are several reasons. One is that welding defects that occur during welding become stress concentrators where fractures start. Another reason is that welding heat coarsens the microstructure of steel plates and, as a result, lowers the fracture toughness Kc that is used as a measure of brittle fracture resistance in welded joints.

In order to prevent deformation and stress concentration in welded joints, it is a basic requirement, in forming welded joints, to make the strength and hardness of the weld metal higher than those of the base metal. That is to say, welded joints are designed to have greater strength than the base metal.

Figure 4:
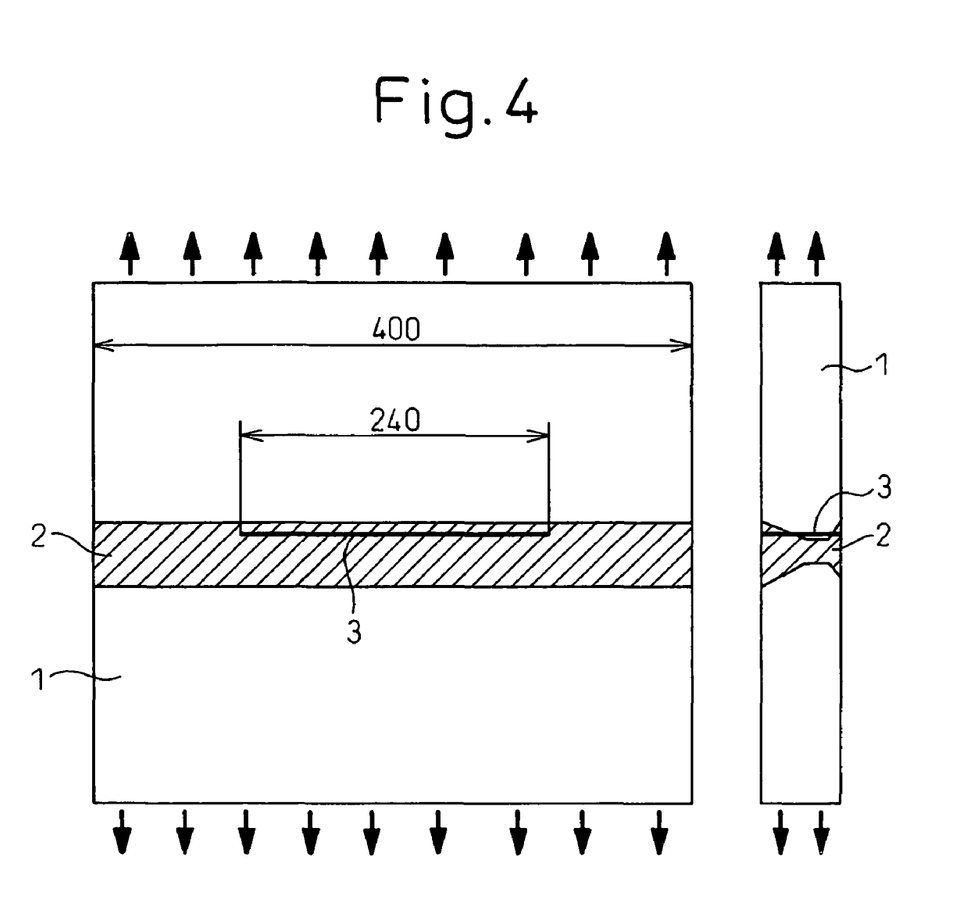
FIG. 4 shows a deep notch test specimen.

Fracture toughness of welded joints is evaluated by a deep notch test that pulls, in the directions indicated by arrows, a test specimen having, as a norm, a 240 mm long notch 3 machined in assumedly the most weak part of welded joint in the middle of a 400 mm wide specimen 1 having a weld metal 2 at the center thereof, as shown in FIG. 4.

Conventionally fracture toughness of welded joints in steel plates for ship structures not more than 50 mm thick have been evaluated by this test and the performance and characteristics required of steel plates for ship construction have been considered.

Steel plates for ship construction having excellent brittle fracture and fatigue characteristics (TMCP steel plates) have been developed by considering the fracture toughness of welds (such as one disclosed in Japanese Unexamined Patent Publication No. 06-88161).

TMCP or other similar steel plates approximately 50 mm in thickness have been used for the construction of large tankers and container ships of not more than 6000 TEU. As construction needs for container ships larger than 6000 TEU have increased, steel plates 60 mm thick or more are being used.

While the upper limit of yield strength of steel plates for ship construction presently in use is approximately 390 MPa, thicker steel plates (such as those thicker than 50 mm) will be used as the size of container ships grows larger.

However, an excess steel plate thickness increase gives rise to various industrial problems, such as increases in welding man-hours, construction cost and the weight of container ships.

SUMMARY OF THE INVENTION

As the size of container ships and other welded structures increases, it is now desired to construct container ships exceeding 6000 TEU by using high-tensile steel plates that are over 50 mm in thickness and have high design stresses.

As welded joints are the most likely spot for fracture, the inventors investigated the performance of large-heat-input welded joints formed by butt welding steel plates not less than 50 mm thick.

The investigation led to a finding that large-heat-input welded joints prepared by butt welding steel plates not less than 50 mm thick do not always show good fracture toughness Kc in the large-scale deep-notch test, though they show good results in the small-scale V-notch Charpy impact test.

Therefore, the object of the present invention is to provide, based on the above finding, welded joints having sufficiently high fracture toughness Kc by butt welding high-strength steel plates for welded ship construction having thickness greater than 50 mm and yield strength of the 460 MPa class.

In order to achieve the above object, the inventors investigated the mechanical properties of base metals and welded joints. In order to prevent deformation and stress concentration in welded joints, the inventors found a new joint design technology that chooses weld metals whose strength and hardness are greater than those of base metals in a break of conventional welded joint designs.

The inventors discovered that the lowering of joint strength by undermatching in the design of large-heat-input butt-welded joints can be prevented by controlling the hardness of the weld metal (that is, joint design by undermatching):

(a1) to not more than 110% of the hardness of the base metal; or (a2) to not less than 70% and not more than 110% of the hardness of the base metal, and, controlling, as required, the width of the weld metal:

(b) to not more than 70% of the plate thickness of the base metal.

The inventors completed the present invention that provides a technology to provide welded joints having high fracture toughness Kc by welding with large-heat-input high-strength steel plates having yield strength of the 460 MPa class and thickness greater than 50 mm (preferably between over 50 mm and approximately 70 mm).

The gist of the present invention is as described below.

(1) A large-heat-input butt-welded joint of welded structures having excellent brittle fracture resistance, is characterized by:

(a1) the hardness of the weld metal is not more than 110% of the hardness of the base metal.

(2) A large-heat-input butt-welded joint of welded structures having excellent brittle fracture resistance, is characterized by:

(a2) the hardness of the weld metal is not less than 70% and not more than 110% of the hardness of the base metal.

(3) A large-heat-input butt-welded joint of welded structures having excellent brittle fracture resistance, is characterized by:

(a1) the hardness of the weld metal is not more than 110% of the hardness of the base metal, and (b) the width of the weld metal is not more than 70% of the plate thickness of the base metal.

(4) A large-heat-input butt-welded joint of welded structures having excellent brittle fracture resistance, is characterized by:

(a2) the hardness of the weld metal is not less than 70% and not more than 110% of the hardness of the base metal, and (b) the width of the weld metal is not more than 70% of the thickness of the base metal.

(5) A large-heat-input butt-welded joint of welded structures having excellent brittle fracture resistance, is characterized by:

(a1) the hardness of the weld metal is not more than 110% of the hardness of the base metal, (b) the width of the weld metal is not more than 70% of the plate thickness of the base metal, and (c) the width of the region affected by welding whose hardness is softened to not more than 95% of the hardness of the non-heat-affected base metal has a width not less than 5 mm.

(6) A large-heat-input butt-welded joint of welded structures having excellent brittle fracture resistance, is characterized by:

(a2) the hardness of the weld metal is not less than 70% and not more than 110% of the hardness of the base metal, (b) the width of the weld metal is not more than 70% of the plate thickness of the base metal, and (c) the width of the region affected by welding whose hardness is softened to not more than 95% of the hardness of the base metal unaffected by heat has a width not less than 5 mm.

(7) A large-heat-input butt-welded joint of welded structures having excellent brittle fracture resistance, is characterized by:

(a1) the hardness of the weld metal is not more than 110% of the hardness of the base metal, (c) the width of the region affected by welding whose hardness is softened to not more than 95% of the hardness of the base metal unaffected by heat has a width not less than 5 mm, and (d) the prior austenite grain size in the heat-affected zone (HAZ) contacting the welding fusion line is not more than 200 μm.

(8) A large-heat-input butt-welded joint of welded structures having excellent brittle fracture resistance, is characterized by:

(a2) the hardness of the weld metal is not less than 70% and not more than 110% of the hardness of the base metal, (c) the width of the region affected by welding whose hardness is softened to not more than 95% of the hardness of the base metal unaffected by heat has a width not less than 5 mm, and (d) the prior austenite grain size in the heat-affected zone (HAZ) contacting the welding fusion line is not more than 200 μm.

(9) A large-heat-input butt-welded joint of welded structures having excellent brittle fracture resistance, is characterized by:

(a1) the hardness of the weld metal is not more than 110% of the hardness of the base metal, (b) the width of the weld metal is not more than 70% of the plate thickness of the base metal, (c) the width of the region affected by welding whose hardness is softened to not more than 95% of the hardness of the non-heat-affected base metal has a width not less than 5 mm, and (d) the prior austenite grain size in the heat-affected zone (HAZ) contacting the welding fusion line is not more than 200 μm.

(10) A large-heat-input butt-welded joint of welded structures having excellent brittle fracture resistance, is characterized by:

(a2) the hardness of the weld metal is not less than 70% and not more than 110% of the hardness of the base metal, (b) the width of the weld metal is not more than 70% of the plate thickness of the base metal, (c) the width of the region affected by welding whose hardness is softened to not more than 95% of the hardness of the non-heat-affected base metal has a width not less than 5 mm, and (d) the prior austenite grain size in the heat-affected zone (HAZ) contacting the welding fusion line is not more than 200 μm.

(11) A large-heat-input butt-welded joint of welded structures having excellent brittle fracture resistance according to any one of the items (1) to (10), is characterized by that the welded structures are prepared by butt-welding high-strength steel plates over 50 mm in thickness.

The present invention forms welded joints with sufficiently high fracture toughness Kc in butt welding high-strength steel plates, in particular high-strength steel plates for welded ship construction, having yield strength of the 460 MPa class and thickness greater than 50 mm.

THE MOST PREFERRED EMBODIMENT

In order to prevent deformation and stress concentration, welded joints have conventionally been designed by making the strength and hardness of the weld metal greater than those of the base metal and welding materials whose strength overmatches that of the base metal have been chosen in the design of welded joints.

The inventors prepared a steel plate having yield strength of the 460 MPa class and made a welded joint by using a welding material that provides an overmatching weld metal and evaluated the mechanical properties of the welded joint by the deep notch test.

Said welded joint showed a sufficiently high value of not less than 90 J at a testing temperature of –20° C. and a fairly good fracture surface transition temperature of –20° C. in the V-notch Charpy test. In the deep notch test, however, fracture toughness Kc was as low as not more than 2000 N/mm$^{1.5}$.

The obtained test result deviated greatly from the conventionally known "interrelation between the results of the V-notch Charpy and deep notch tests".

Detailed investigation of the fracture starting points in the deep notch test led to the following findings:

(i) Fracture occurred in the boundary (that is, the fusion line (FL) between the weld metal (WM) and heat-affected zone (HAZ).

(ii) The microstructure of the region in which fracture started was the same as that of the region in which fracture occurred in the Charpy test specimen.

The inventors also made the following finding by analyzing the distribution pattern of local stress that acts as the driving force in the deep notch and Charpy tests by three-dimensional finite element method:

(iii) The distribution pattern of local stress differs greatly in the deep notch and Charpy tests.

Figure 3:
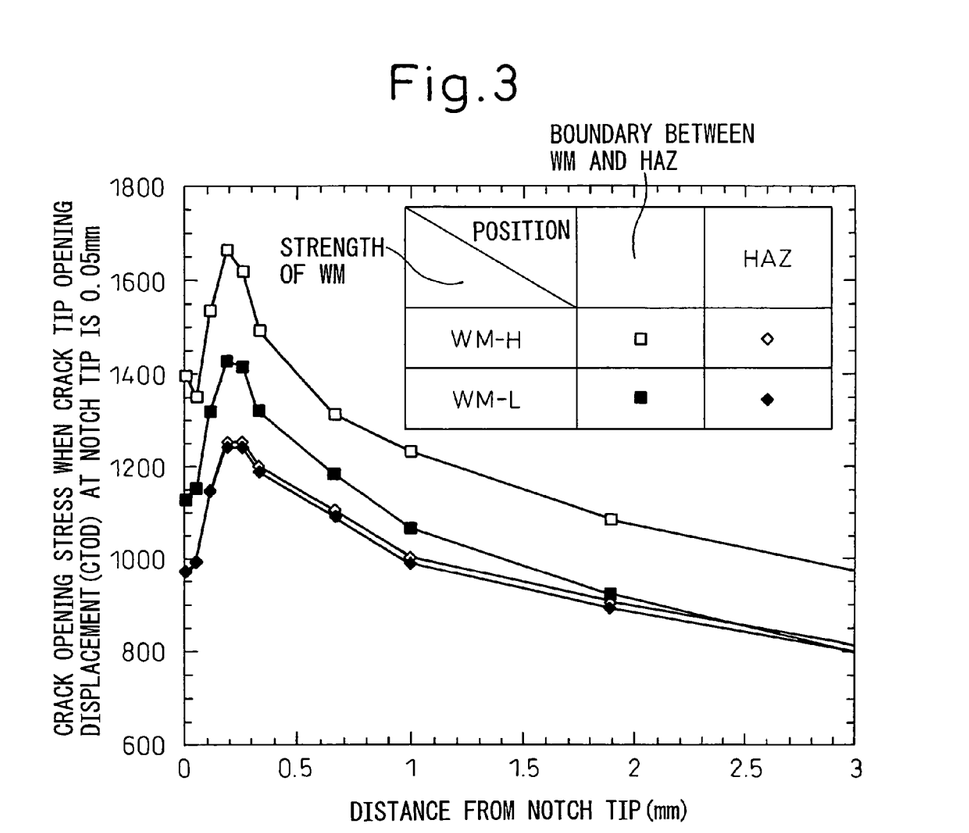
FIG. 3 shows the crack opening stress distribution at points at given distances away, in the direction of crack propagation, from the notch tip where the CTOD (crack tip opening displacement) is 0.05 mm at the tip of notches made in the boundary (FL) between the weld metal (WM) and heat-affected zone (HAZ) and in the heat-affected zone (HAZ) of 70 mm thick test specimens.

FIG. 3 shows an example of the crack opening stress distribution analyzed by the three-dimensional finite element method (FEM) at points at given distances away, in the direction of crack propagation, from the notch tip where the CTOD (crack tip opening displacement) is 0.05 mm at the tip of notches made in the boundary (FL) between the weld metal (WM) and heat-affected zone (HAZ) and in the heat-affected zone (HAZ) of 70 mm thick test specimens.

This diagram shows that:

(iv) The constraining force in the direction of plate thickness increases greatly when plate thickness exceeds 50 mm and approaches approximately 70 mm and local stress increases greatly at the boundary between the weld metal (WM) and heat-affected zone (HAZ) when the strength of the weld metal (WM) is greater than the strength of the base metal (BM) or heat-affected zone (HAZ) (as indicated by □ (WM-H) and ■ (WM-L)).

When the strength of the weld metal (WM) is greater than the strength of the base metal (BM) or heat-affected zone (HAZ) (that is in the case WM-H), local stress does not increase and remains substantially equal to the case (WM-L) in which the strength in the weld metal (WM) is low.

Thus, it can be considered that the lowering of Kc is due to the local stress increase at the boundary between the weld metal (WM) and heat-affected zone (HAZ) that occurs when the strength of the weld metal (WM) is greater than the strength in the base metal (BM) and heat-affected zone (HAZ) (that is, in the case WM-H).

Based on the above analysis, the inventors found that:

(v) In order to increase Kc by controlling the great increase in local stress at the boundary between the weld metal (WM) and heat-affected zone (HAZ), it is necessary to lower the strength of the weld metal (WM) as much as possible.

Figure 1:
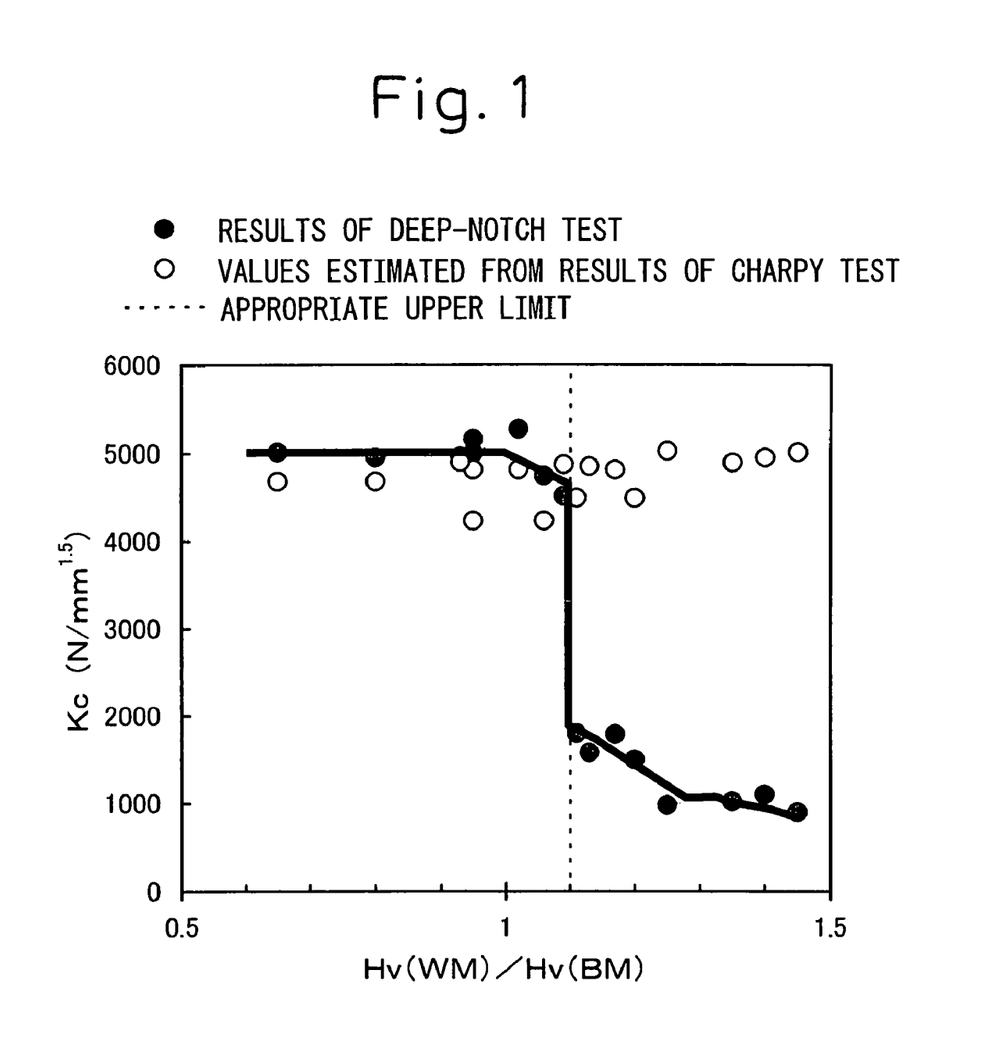
FIG. 1 shows the effect of the weld metal and base metal on fracture toughness Kc.

By determining the fracture toughness Kc by varying the hardness of the weld metal (Hv(WM)) based on the result of the above analysis and plotting the values of Kc vs. the "hardness of the weld metal [Hv(WM)]/hardness of the base metal [Hv(BM)], it was found that the lowering of fracture toughness due to the increase in local stress can be prevented by controlling the hardness of the weld metal [Hv(WM)] to not more than 110% of the hardness of the base metal [Hv(BM)], as indicated by ● in FIG. 1.

It was discovered that it is necessary for increasing the fracture toughness Kc of welded joint to make the hardness of the weld metal [Hv(WM)] lower than the hardness of the base metal [Hv(BM)]. If, however, the hardness of the weld metal [Hv(WM)] is lowered, the strength (tensile strength) of welded joints decreases to such levels as will cause fatal problems in structures.

Figure 2:
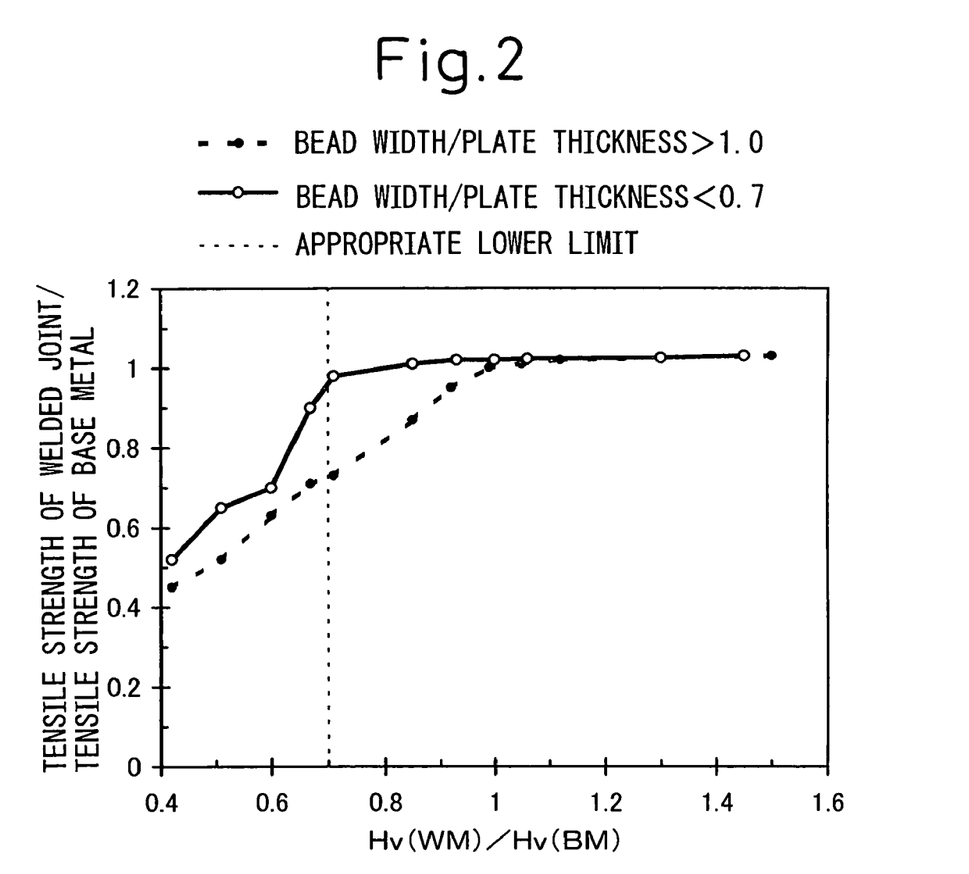
FIG. 2 shows the relationship between the hardness ratio between the weld metal and base metal, bead width and joint strength.

So, the lower limit of the weld metal strength required for securing as much strength as that of the base metal in welded joints was empirically studied. Then, it was found that adequate strength (tensile strength) can be secured in welded joints even if the hardness of the weld metal [Hv(WM)] drops to 70% of the hardness of the base metal [Hv(BM)] if the width of the weld metal (bead width) is limited to not more than 70% of the plate thickness in the region where the width of the weld metal (bead width) has a great effect, as shown in FIG. 2.

In order to secure the desired fracture toughness Kc in welded joints, it is necessary to insure that local stress does not increase along the fusion line (FL) that is the weakest part of the welded joint, as mentioned earlier. At the same time, it is also important to enhance the microstatic brittle fracture resistance in and around the fusion line (FL).

Studies on the mechanism that create brittle fracture in the vicinity of the fusion line (FL) led to a finding that keeping the grain size of prior austenite small is conducive to improving the brittle fracture resistance because the pro-eutectoid ferrite in the vicinity of prior austenite and lath-like upper bainite and ferrite side plate in prior austenite become the starting point of fracture.

The result of the experiment conducted by the inventors indicates that it is preferable to keep the prior austenite grain size in the heat-affected zone (HAZ) contacting the fusion line (FL) at or below 200 μm.

The inventors also discovered that the occurrence and distribution of local stress along the fusion line (FL) in contact with the weld metal is governed by the hardness of the weld metal and there is a tendency that the local stress along the fusion line (FL) is lessened if the heat-affected zone (HAZ) in contact with the fusion line (FL) has a large "softened region".

It is preferable to insure that the softened region in the heat-affected zone (HAZ) is not less than 5 mm in width as said lessening was observed when the width of the softened region in the heat-affected zone (HAZ) was not less than 5 mm in the experiment conducted by the inventors.

In principle, local stress decreases if the hardness of the heat-affected zone (HAZ) is lower than the hardness of the base metal. In the experiment conducted by the inventors, however, local stress decreased definitely when the hardness of the heat-affected zone (HAZ) was lower than the hardness of the base metal by not less than 5%.

Therefore, it is preferable to insure that the region of the heat-affected zone that is softened to not more than 95% of the hardness of the base metal unaffected by heat has a width not smaller than 5 mm.

The high-strength steel plates for welded structures and ship shells used with the present invention can be manufactured from structural steels for welding purposes of known compositions.

Preferable steels are, for example, those comprising, by mass %, C of 0.02 to 0.20%, Si of 0.01 to 1.0%, Mn of 0.3 to 2.0%, Al of 0.001 to 0.20%, N of not more than 0.02%, P of not more than 0.01% and S of not more than 0.01%, and containing one or more of Ni, Cr, Mo, Cu, W, Co, V, Nb, Ti, Zn, Ta, Hf, REM (rare-earth metal), Y, Ca, Mg, Te, Se and B, as required for the enhancement of base metal strength, joint toughness and other properties.

While thickness of plates is not specifically limited, it is preferable to apply the present invention to, for example, high-strength steel plates, for large ship shells, exceeding 50 mm in thickness.

Chemical composition and welding methods of welding materials are also not particularly limited so long as the characteristics specified by the present invention are satisfied.

While it is preferable that welding materials comprise C of 0.01 to 0.06%, Si of 0.2 to 1.0%, Mn of 0.5 to 2.5%, Ni of 0 to 4.0%, Mo of 0 to 0.30%, Al of 0 to 0.3%, Mg of 0 to 0.30%, Ti of 0.02 to 0.25% and B of 0 to 0.050%, choice can be made as appropriate by considering the chemical composition of the steel plate.

Welding is performed by VEGA (single electrode oscillating electro gas welding), VEGA-II (double electrode oscillating electro gas welding), EG (electro gas welding) and SAW (submerged arc welding).

In welding 70 mm thick steel plates with two welding wires within said composition range by VEGA-II, it is preferable, for example, to use a voltage of 42 V, a current of 390 A, a welding speed of 4.2 m/min., a heat input of not less than 450 kJ/cm. It is also preferable that the groove angle, groove width and root gap are 20° C., 33 mm and 8 mm, respectively.

In welding 70 mm thick steel plates by SAW, multi-layer welding is done with a 4.8 mm diameter welding wire, a current of 650 A, a voltage of 33 V and a welding speed of 60 cm/min. Large-heat-input is done by packing the back side with copper or asbestos and increasing the current.

$CO_2$-welding is performed with, for example, 1.4 mm diameter welding wire and a current of approximately 200 to 450 A. Welding conditions are not particularly limited to the examples described above. The effect of the present invention can be obtained by choosing appropriate welding conditions and controlling the hardness of the weld metal and bead width to within the range specified by the present invention.

While welding conditions are not particularly limited so long as the hardness of the weld metal and bead width are precisely controlled within the range specified by the present invention, electro gas welding with a consumable electrode, for example, is outside the scope of the present invention because the bead width becomes greater than the plate thickness.

Laser welding and electron beam welding, which can easily control the width of weld beads, are within the scope of the present invention so long as the bead width and the hardness of the weld metal are controlled to within the range specified by the invention.

Welding methods that do not use welding materials tend to make the hardness of the weld metal greater than the hardness of the base metal because the weld metal is formed by the melting and solidification of the base metal. Therefore, such welding methods are outside the scope of the present invention if the hardness of the weld metal is outside the range specified by the invention.

EXAMPLE

The present invention is now described by reference to an example tested under the conditions employed to confirm the practicability and effect of the invention. The present invention is not limited to said conditions.

The present invention can be practiced under various conditions and combinations thereof without departing from the scope and spirit of the invention so long as the object of the invention is achieved.

Example 1

Characteristics and performance of welded joints were tested and investigated by using steel plates 50 to 100 mm in thickness. Table 1 shows the results. Tables 3 and 4 show the chemical compositions (types of steel) of the steel plates and the welding materials in the butt welds.

Welding was performed by VEGA, VEGA-II, EG and SAW under the conditions shown in Table 2.

The groove angle and root gap were 20 degrees V groove and 8 mm in VEGA, 20° V groove and 8 mm in VEGA-II and EG, and 40 degrees Y groove and 2 mm in SAW.

The hardness of the base metal [Hv(BM)] is the average hardness across the thickness of the steel plate that was determined by pressing a 10 kg indenter therein. The hardness of the weld metal [Hv(WV)] is the hardness of the weld metal determined by pressing a 10 kg indenter at the center of the thickness of the weld metal.

The bead width is the average of the values measured at the front and back sides and the center of the thickness of the weld metal.

The width of the softened region in the heat-affected zone (HAZ) is the width of the region extending from the fusion line toward the base metal in which hardness softens by 5% from the hardness of the base metal.

The prior austenite grain size in the heat-affected zone (HAZ) is that in the heat-affected zone in contact with the fusion line expressed in terms of equivalent diameter.

The fracture surface transition temperature vTrs (° C.) was determined by varying the testing temperature applied on the test specimens that were prepared so that the fusion line (FL), which is the weakest part of the welded joint, is at the center of the thickness thereof.

The fracture toughness Kc ($N/mm^{1.5}$) was determined by said deep-notch test at −20° C. The values with the [>] mark indicate that, despite the trace of ductile cracks resulting from sufficient deformation of the notch in the test specimen, the specimen width of 400 mm inhibited further measurement of the Kc value.

The tensile strength of the welded joint (MPa) indicates the strength at which the NKU No. 1 test specimen fractured in the joint tensile test.

As shown in Table 1, test specimens Nos. 1 to 17 according to the present invention showed sufficient fracture toughness Kc because all conditions are within the ranges specified by the invention.

Test specimens Nos. 1 to 14 showed that welded joints have sufficient fracture toughness and tensile strength because the Hv(WM)/Hv(BM), bead width/plate thickness and the width of the softened region in the heat-affected zone were within the specified ranges.

The Kc value of test specimen No. 14 was somewhat lower than those of test specimens Nos. 1 to 13 because the width of the softened region in the heat-affected zone was smaller than the preferable range of the present invention. Still, the Kc value was as good as not lower than 3000 $N/mm^{1.5}$.

Test specimen No. 15 showed a sufficient Kc value as the fracture surface transition temperature vTrs was substantially equal to those with test specimens Nos. 1 to 14. However, the joint strength was low because the Hv(WM)/Hv(BM) ratio was lower than the preferable range.

Test specimens Nos. 16 and 17 showed low joint strength because the bead width/plate thickness ratio exceeded the preferable range of the present invention.

Specimens Nos. 18 to 22 tested for comparison showed low fracture toughness Kc in welded joints because the Hv(WM)/Hv(BM) ratio exceeded the upper limit specified by the present invention, though the fracture surface transition temperature vTrs in the Charpy test was substantially equal to those with test specimens Nos. 1 to 17 according to the present invention.

Thus, the present invention that provides appropriate fracture toughness Kc in welded joints of high-strength steel plates having a yield point of not less than 470 MPa and a thickness of not less than 50 mm is a novel invention.

TABLE 1

| | | | | | | | Butt-welded Joint | |
| --- | --- | --- | --- | --- | --- | --- | --- | --- |
| | | NO. | Type of Steel | Plate Thickness (mm) | Tensile Strength of Base Metal (MPa) | Welding Method | Welding Condition | Characteristics of Welded Joint | |
| | | | | | | | | Hv(BM) | Hv(WM) |
| Specimens of the | | 1 | YP47 | 70 | 630 | VEGA-II | EG-60M1 | 202 | 212 |
| | | 2 | YP47 | 70 | 620 | EG | EG-60M2 | 204 | 200 |

TABLE 1-continued

| | NO. | | | | | | | |
|---|---|---|---|---|---|---|---|---|
| Present Invention | 3 | YP47 | 65 | 650 | EG | EG-60M3 | 210 | 151 |
| | 4 | YP47 | 70 | 643 | VEGA-II | EG-60M4 | 205 | 226 |
| | 5 | YP40 | 70 | 570 | VEGA-II | EG-3 | 175 | 186 |
| | 6 | YP47 | 60 | 630 | VEGA-II | EG-60M1 | 215 | 204 |
| | 7 | YP47 | 55 | 620 | VEGA | EG-60M1 | 210 | 208 |
| | 8 | YP47 | 70 | 610 | VEGA-II | EG-60M3 | 200 | 206 |
| | 9 | YP47 | 50 | 605 | SAW | EG-60M1 | 195 | 205 |
| | 10 | YP47 | 65 | 602 | SAW | EG-60M2 | 210 | 227 |
| | 11 | YP47 | 75 | 610 | SAW | EG-60M3 | 204 | 222 |
| | 12 | YP40 | 80 | 580 | VEGA-II | EG-3 | 183 | 134 |
| | 13 | YP47 | 100 | 634 | VEGA-II | EG-60M4 | 210 | 200 |
| | 14 | YP47 | 55 | 640 | SAW | EG-60M1 | 210 | 208 |
| | 15 | YP47 | 70 | 635 | EG | EG-60M2 | 205 | 133 |
| | 16 | YP47 | 70 | 650 | VEGA-II | EG-60M1 | 220 | 224 |
| | 17 | YP47 | 60 | 634 | SEG-II | EG-60M3 | 215 | 204 |
| Specimens for Comparison | 18 | YP47 | 70 | 621 | VEGA-II | EG-60 | 202 | 265 |
| | 19 | YP47 | 70 | 636 | EG | EG-60 | 204 | 235 |
| | 20 | YP47 | 65 | 601 | EG | EG-60 | 210 | 258 |
| | 21 | YP47 | 70 | 633 | VEGA-II | EG-60M | 204 | 235 |
| | 22 | YP47 | 65 | 640 | VEGA-II | EG-60M | 210 | 258 |

| | NO. | Hv(WM)/Hv(BM) | Characteristics of Welded Joint Bead Width/Plate Thickness | Width of Softened Region in HAZ (mm) | Prior Austenite Grain Size in HAZ (μm) | Performance of Welded Joint vTrs in Charpy Test (° C.) | Kc (N/mm$^{1.5}$) | Tensile Strength of Joint (MPa) |
|---|---|---|---|---|---|---|---|---|
| Specimens of the Present Invention | 1 | 1.05 | 0.45 | 12 | 180 | −5 | 4980 | 610 |
| | 2 | 0.98 | 0.67 | 15 | 190 | −10 | >5200 | 602 |
| | 3 | 0.72 | 0.66 | 13 | 170 | −1 | 4200 | 590 |
| | 4 | 1.1 | 0.51 | 15 | 150 | −3 | 4890 | 620 |
| | 5 | 1.06 | 0.4 | 18 | 165 | −25 | >5100 | 615 |
| | 6 | 0.95 | 0.46 | 16 | 175 | 2 | 4100 | 623 |
| | 7 | 0.99 | 0.61 | 7 | 55 | −30 | >5100 | 598 |
| | 8 | 1.03 | 0.45 | 17 | 120 | −3 | 4230 | 602 |
| | 9 | 1.05 | 0.68 | 8 | 45 | −15 | 5100 | 620 |
| | 10 | 1.08 | 0.5 | 11 | 58 | −23 | >5100 | 615 |
| | 11 | 1.09 | 0.67 | 8 | 75 | −10 | 4850 | 610 |
| | 12 | 0.73 | 0.4 | 12 | 280 | 3 | 4100 | 590 |
| | 13 | 0.95 | 0.35 | 13 | 190 | −8 | 4250 | 610 |
| | 14 | 0.99 | 0.61 | 3 | 55 | −25 | 3520 | 598 |
| | 15 | 0.65 | 0.51 | 15 | 150 | −6 | 4720 | 502 |
| | 16 | 1.02 | 1.2 | 18 | 165 | −28 | >5100 | 490 |
| | 17 | 0.95 | 0.8 | 16 | 175 | −10 | 4100 | 520 |
| Specimens for Comparison | 18 | *1.31 | 0.45 | 12 | 180 | −4 | 980 | 610 |
| | 19 | *1.15 | 0.67 | 15 | 190 | −12 | 1500 | 602 |
| | 20 | *1.23 | 0.66 | 13 | 170 | −5 | 950 | 590 |
| | 21 | *1.15 | 1.2 | 15 | 190 | −8 | 1500 | 460 |
| | 22 | *1.23 | 0.8 | 13 | 170 | −3 | 980 | 480 |

*Outside the scope of the present invention

TABLE 2

| Welding Method | Welding Condition | Plate Thickness (mm) | Current I(A) | Voltage E(V) | Welding Speed v(cm/min) | Heat Input (kJ/cm) | Wire Diameter (mm) |
|---|---|---|---|---|---|---|---|
| VEGA | VS1 | 50 | 400 | 40 | 2.9 | 331 | 1.6 |
| | VS2 | 55 | 400 | 40 | 2.5 | 383 | 1.6 |
| | VS3 | 60 | 400 | 40 | 2.2 | 439 | 1.6 |
| | VS4 | 65 | 400 | 40 | 1.9 | 498 | 1.6 |
| VEGA-II | V1 | 55 | 420 | 42 | 6.5 | 326 | 1.6 |
| | V2 | 60 | 420 | 42 | 6.0 | 353 | 1.6 |
| | V3 | 70 | 420 | 42 | 4.5 | 470 | 1.6 |
| | V4 | 80 | 420 | 42 | 4.0 | 529 | 1.6 |
| | V5 | 100 | 440 | 44 | 3.5 | 664 | 1.6 |
| EG | E1 | 60 | 420 | 42 | 3.0 | 353 | 1.6 |
| | E2 | 65 | 420 | 42 | 2.5 | 423 | 1.6 |
| | E3 | 70 | 420 | 42 | 2.1 | 504 | 1.6 |

TABLE 2-continued

| Welding Method | | Welding Condition | Plate Thickness (mm) | Current I(A) | Voltage E(V) | Welding Speed v(cm/min) | Heat Input (kJ/cm) | Wire Diameter (mm) |
|---|---|---|---|---|---|---|---|---|
| SAW | Single pass welding | S1 | 55 | Advance 2100 | 42 | 18 | 571 | 6.4 |
| | | | | Post 1600 | 52 | | | 6.4 |
| | Seven pass welding | S2 | 65 | Advance 1400 | 37 | 40 | 159 | 6.4 |
| | | | | Post 1200 | 45 | | | 6.4 |
| | | S3 | 75 | Advance 1400 | 37 | 35 | 181 | 6.4 |
| | | | | Post 1200 | 45 | | | 6.4 |

TABLE 3

| Type of Steel | C | Si | Mn | P | S | Ni | Ti (mass %) |
|---|---|---|---|---|---|---|---|
| YP40 | 0.11 | 0.21 | 1.30 | 0.006 | 0.003 | | 0.01 |
| YP47 | 0.08 | 0.24 | 1.22 | 0.007 | 0.002 | 1.02 | 0.01 |

TABLE 4

| Welding Material | C | Si | Mn | P | S | Mo | Ni (mass %) |
|---|---|---|---|---|---|---|---|
| EG-1 | 0.10 | 0.33 | 1.45 | 0.015 | 0.010 | 0.27 | |
| EG-3 | 0.08 | 0.29 | 1.85 | 0.011 | 0.008 | 0.15 | |
| EG-60 | 0.10 | 0.34 | 1.68 | 0.016 | 0.100 | 0.29 | |
| EG-60M | 0.08 | 0.29 | 1.81 | 0.011 | 0.010 | 0.00 | 4.10 |
| EG-60M1 | 0.07 | 0.29 | 1.81 | 0.011 | 0.010 | 0.10 | 1.50 |
| EG-60M2 | 0.06 | 0.29 | 1.81 | 0.007 | 0.006 | 0.12 | 3.10 |
| EG-60M3 | 0.03 | 0.29 | 1.81 | 0.011 | 0.010 | 0.25 | 1.00 |
| EG-60M4 | 0.11 | 0.31 | 2.10 | 0.008 | 0.003 | 0.24 | 0.50 |

INDUSTRIAL APPLICABILITY

The present invention prevents fatal damage and fracture of welded structures because brittle fracture is hardly occurs in large-heat-input welded joints of thick high-strength steel plates even when there are some welding defects and fatigue cracks occur and develop.

Thus, the present invention, that significantly enhances the safety of welded structures, has a great industrial applicability.

The invention claimed is:

1. A large-heat-input butt-welded joint of welded structures prepared by butt-welding high strength steel plates over 50 mm in thickness, having excellent brittle fracture resistance, characterized by:
   (a) the hardness of the weld metal is not less than 70% and not more than 110% of the hardness of the base metal, and
   (b) the width of the weld metal is not more than 70% of the plate thickness of the base metal.

2. A large-heat-input butt-welded joint of welded structures prepared by butt-welding high strength steel plates over 50 mm in thickness, having excellent brittle fracture resistance, characterized by:
   (a) the hardness of the weld metal is not less than 70% and not more than 110% of the hardness of the base metal,
   (b) the width of the weld metal is not more than 70% of the plate thickness of the base metal, and
   (c) the width of the region affected by welding whose hardness is softened to not more than 95% of the hardness of the base metal unaffected by heat has a width not less than 5 mm.

3. A large-heat-input butt-welded joint of welded structures prepared by butt-welding high strength steel plates over 50 mm in thickness, having excellent brittle fracture resistance, characterized by:
   (a) the hardness of the weld metal is not less than 70% and not more than 110% of the hardness of the base metal,
   (b) the width of the region affected by welding whose hardness is softened to not more than 95% of the hardness of the base metal unaffected by heat has a width not less than 5 mm, and
   (c) the prior austenite grain size in the heat-affected zone (HAZ) contacting the welding fusion line is not more than 200 µm.

4. A large-heat-input butt-welded joint of welded structures prepared by butt-welding high strength steel plates over 50 mm in thickness, having excellent brittle fracture resistance, characterized by:
   (a) the hardness of the weld metal is not less than 70% and not more than 110% of the hardness of the base metal,
   (b) the width of the weld metal is not more than 70% of the plate thickness of the base metal,
   (c) the width of the region affected by welding whose hardness is softened to not more than 95% of the hardness of the non-heat-affected base metal has a width not less than 5 mm, and
   (d) the prior austenite grain size in the heat-affected zone (HAZ) contacting the welding fusion line is not more than 200 µm.

5. The large-heat-input butt-welded joint of claim 1, 2, 3 or 4, wherein the thickness of the high strength steel plates is 50 mm to 100 mm.

6. The large-heat-input butt-welded joint of claim 5, wherein the thickness of the high strength steel plates is 70 mm to 100 mm.

7. The large-heat-input butt-welded joint of claim 1, 2, 3 or 4, wherein the joint is prepared by welding with a heat input of 159 kJ/cm or more.

8. The large-heat-input butt-welded joint of claim 1, 2, 3 or 4, wherein the high strength steel plate has a tensile strength of 390 MPa or higher.

9. The large-heat-input butt-welded joint of claim 1, 2, 3 or 4, wherein the high strength steel plate has a tensile strength of 460 MPa or higher.

10. A container ship comprising the large-heat-input butt-welded joint of claim 1, 2, 3 or 4.

* * * * *